(12) United States Patent
Stirling

(10) Patent No.: US 6,751,682 B1
(45) Date of Patent: Jun. 15, 2004

(54) LOCAL COMMUNICATION SYSTEM, METHOD OF OPERATION AND STATIONS FOR USE THEREIN

(75) Inventor: Andrew J. Stirling, Surrey (GB)

(73) Assignee: Communication-& Control Electronics Limited, Surrey (GB)

(*) Notice: Subject to any disclaimer, the term of this patent is extended or adjusted under 35 U.S.C. 154(b) by 0 days.

(21) Appl. No.: 09/518,256

(22) Filed: Mar. 3, 2000

Related U.S. Application Data (63) Continuation of application No. PCT/GB98/00872, filed on Mar. 23, 1998.

(30) Foreign Application Priority Data

Sep. 4, 1997 (GB) .............................. 9718722

(51) Int. Cl.$^7$ ................................ G06F 3/00
(52) U.S. Cl. .................... 710/9; 710/10; 709/220; 709/222
(58) Field of Search ................ 709/220, 222; 340/825.25; 710/9, 10

(56) References Cited

U.S. PATENT DOCUMENTS

| | | | | |
|---|---|---|---|---|
| 4,899,274 A | * | 2/1990 | Hansen et al. ............ | 709/222 |
| 5,150,464 A | * | 9/1992 | Sidhu et al. .............. | 709/222 |
| 5,166,931 A | * | 11/1992 | Riddle ...................... | 370/401 |
| 5,305,355 A | * | 4/1994 | Go et al. .................. | 375/356 |
| 5,436,851 A | * | 7/1995 | Shimotsuma et al. .. | 340/825.25 |
| 5,530,896 A | * | 6/1996 | Gilbert ...................... | 710/9 |
| 5,535,336 A | * | 7/1996 | Smith et al. .............. | 709/225 |

FOREIGN PATENT DOCUMENTS

| | | |
|---|---|---|
| EP | 436932 | 7/1991 |
| EP | 616286 | 9/1994 |
| EP | 725516 | 8/1996 |
| FR | 2689259 | 10/1993 |
| WO | 9501026 | 1/1995 |
| WO | WO 95/01026 | * 1/1995 |

OTHER PUBLICATIONS

Communication & Control Electronics: "Plus Points for D2B Optical" Plus Points for D2B Optical, Oct. 24, 1997, pp. 1–1, XP002082400 http://www.candc.co.uk/pages/news/firstpressrelease.htm Retrieved from the Internet on Oct. 15$^{th}$, 1998 see the whole document.

* cited by examiner

Primary Examiner—Jeffrey Gaffin
Assistant Examiner—Harold Kim
(74) Attorney, Agent, or Firm—Nixon & Vanderhye P.C.

(57) ABSTRACT

A local communication system comprises a plurality of stations exchanging control messages via a ring network. One of which stations is designated a master station with the other stations designated as slave stations. Each of the slave stations has the capability to implement an autonomous process to find and store for future use its own unique address within a set of allowable addresses. Each slave station is arranged only to begin the autonomous process to seek its own address when individually instructed by a command from the master station to do so.

29 Claims, 7 Drawing Sheets

LOCAL COMMUNICATION SYSTEM, METHOD OF OPERATION AND STATIONS FOR USE THEREIN

This application is a continuation of PCT application PCT/GB98/00872 filed Mar. 23, 1998.

FIELD OF THE INVENTION

The present invention relates to a local communication system comprising a plurality of stations interconnected in a network for the communication of messages, and in particular, to the initialisation procedures of the system after start up. The invention further relates to stations for use in such a system, and methods of operation therein

BACKGROUND ART

A local communication system which combines source data (CD audio, MPEG video, telephone audio etc) with control messages in a low cost fibre network has been proposed in the form of D2B Optical. For details, see for example the "Conan Technology Brochure" and the "Conan IC Data Sheet" available from Communication & Control Electronics Limited, 2 Occam Court, Occam Road, The Surrey Research Park, Guildford, Surrey, GU2 5YQ (also http://www.candc.co.uk). See also Eurpoean patent applications of Becker GmbH EP-A-0725516 (95P03), EP-A-0725518 (95P04), EP-A-07225515 (95P05), EP-A-0725520 (95P06), EP-A-0725521 (95P07), EP-A-0725522 (95P08), EP-A-0725517 (95P09) and EP-A-0725519 (95P10). "Conan" is a registered trade mark of Communication & Control Electronics Limited. "D2B" is a registered trade mark of Philips Electronics NV.

In D2B Optical, each station obtains at an earlier stage a unique physical address, based on ring position, by a procedure described in EP-A-0725516 mentioned above, but there is still a desire for logical addressing of stations, for use at the application level. WO-A-95/01025 (PHQ 93006) describes address initialisation procedures for use with the earlier D2B network. Similar procedures can be implemented in the control message channel of the D2B Optical network.

With the system proposed and described in WO95/01025 each individual station upon start-up implements an autonomous process to find a unique device address (logical address) appropriate to its functionality. To this end, each station selects an address, and then verifies that the address is unique and available by sending a message to the address and listening for a response. In the absence of a response message the selected station assumes that the address is available and unique and adopts that as its address. If a response is received, the address is incremented and tried again until a free address is found. If no free address is found, a special default address is adopted.

According to the references, the starting point for this process is may be the last address that the station had been assigned. The hope with this type of arrangement is that the system and in particular the devices will maintain the same address from start-up to start-up. This works well once the system is stable but it has been found not so effective where the system is subject to a high degree of fluidity in its make up. A particular problem arises upon the first start up of a system after installation of several new stations. The probability increases in that case that addresses will be assigned differently in nominally identical systems, and there is even a small risk that the two stations might simultaneously acquire the same address.

The possibility with the system that two or more stations will have the same address (something that these prior patent applications are directed towards preventing) is therefore not wholly overcome. There is also a desire for a system which will address repeatably in identical installations.

SUMMARY OF THE INVENTION

The present invention aims to provide an improved system for address initialisation in networks.

In accordance with a first aspect of the present invention, there is provided a local communication system comprising a plurality of stations, one of which stations is designated a master station with the other stations designated as slave stations, which plurality of stations are interconnected in a network for the exchange of messages, wherein each of the stations has the capability to implement an autonomous process to find, and store for future use, its own unique address wherein each slave station is arranged only to begin said autonomous process to find its own address and when individually instructed by a command from the master station to do so.

In such a system the initialisation processes of the devices can be directly or indirectly controlled by the master such that two or more devices swapping addresses, or (worse) having the same address can be prevented. In particular, the master station may be arranged, at least where a group of two or more slave stations may seek addresses within the same set of addresses, to instruct the slave stations of said group one at a time. Note that the terms "Master" and "Slave" are used in WO-A-95/01025 with a different meaning, merely indicating the source and destination respectively for a given data message. In the present case, one station is designated system master, at least for the purpose of address initialisation.

The unique address may comprise a logical address additional to a unique physical address already assigned prior to said autonomous process. The slave stations may be authorised to begin said autonomous process by means of messages addressed using said physical address. In effect, each of the stations has a multiplicity of addresses by which it can receive messages from the master and other stations on the system. In the embodiments described, these include the device address (a unique, function-related address), the broadcast address (shared with all stations), groupcast address (shared by all stations of one group) and ring position address (unique physical address). Some of these addresses may be preset in the factory whilst other of the addresses are to be set during operation of the system. In either case, stability and uniqueness of these addresses is desired.

The slave station may be provided with a physical address, and arranged to report its presence to the master station together with its physical address. The report may also specify whether the station is installed or uninstalled, and can specify the logical address already known for the installed devices. The slave may be arranged to delay sending its presence report by an amount depending on the physical address of the slave station, so that the master station will not receive presence reports from all slave stations simultaneously.

The system may be set up so that the stations are regarded as either installed or uninstalled by the master station with a new station only becoming installed when it has once been instructed by the system master to seek its own device address and has successfully achieved this. All the other stations in the system are regarded by the master station device as uninstalled, and may assume a general default device address. Installed stations may or may not also be instructed individually to seek a unique address. In the embodiment, the installed stations merely confirm that the address they have stored from a previous start-up is still unique, and only uninstalled stations require instruction from the master to seek a unique address.

Further, the system may be set up so that the installed devices are instructed by the master to initialise their addresses before the uninstalled devices are instructed to seek and initialise addresses. Alternatively, the installed devices may spontaneously act to confirm their device addresses, by a modified autonomous process.

The uninstalled devices may be instructed to seek a unique address (either strictly or approximately) in the order of their position in the network (physical address). In the embodiment described, the slave stations are arranged so as to report their uninstalled status and ring position in a staggered sequence, and the master instructs each one automatically in response to its own report. Alternatively, the master may operate by first identifying all uninstalled devices, and then instructing in turn to seek their own addresses. The master may or may not wait until each has found a unique address before instructing the next one.

In the autonomous process, the stations may seek their addresses by sending a signal to a succession of candidate addresses and monitoring responses until one is found which is free. This is similar to the verification process used in the cited earlier application.

However, in this case the devices are not all attempting to carry out the procedure at the same time so there is a significantly reduced chance of messages conflicting and not being acknowledged when they should be. Consequently, the address initialisation in the present system is more reliable in its operation.

In one particular arrangement of the system the network (optical, electrical etc) has a ring topology. In this case the above references to the position in the network are in fact references to the position in the ring.

As mentioned above, each station may begin with a general default address which it over-writes with its unique address when it has successfully found one which is available. Should the station be unable to locate an unique address it will retain the default address as its device address for the meantime.

Typically the general default address is given to all the stations in the system, at the factory. Alternatively, the stations are provided with or have a different default device address to the general default address. This may occur as a result of the station already having been used in another system or even elsewhere in the same system. In such a case, the device will typically seek to verify that the address it has is unique and if not the section may seek a unique address or ultimately revert to the general default address for the system.

An apparatus for use as a station in the present system may have volatile as well as nonvolatile memory capacity and the system may be configured so that it stores its unique address in the non-volatile memory. Installed stations can therefore remember their installed status even when power is removed from the system. "Start-up" as used herein may also refer to entering an operational state from a stand-by state, in which power is maintained and volatile memory may be sufficient.

When seeking a unique address the device may be configured to search for a free address within a specific range or other set of addresses. All stations may seek device addresses in the same range. As described in WO-A-95/01025, however, the range of addresses within which a device may seek to find an address may be different for different devices in the system, depending for example on device type (CD player, amplifier etc). In such a system, it is permissible for the master to instruct several stations to seek addresses at the same time, provided they are of different types.

The invention further provides an apparatus for use as a slave station with other stations in a local communication system, the apparatus comprising means for implementing after start-up an autonomous process to find and store for future use a unique address within a set of allowable addresses, wherein the apparatus when operating as a slave station is arranged to initiate said autonomous process only in response to a command sent from a master station to the slave station individually.

The invention yet further provides an apparatus for use as a master station with other stations in a local communication system, the apparatus when operating as the master station comprising means for instructing each slave station individually after start-up to implement an autonomous process to find and store for future use a unique address among a set of allowable addresses, wherein the apparatus is arranged to instruct each slave station individually to initiate said autonomous process.

The invention yet further provides a method of operating a local communication system comprising a plurality of stations of which one station is designated a master station and the other stations are designated as slave stations, plurality of stations being interconnected in a network for the exchange of messages, wherein each station has the capability autonomously to find and store for future use its own unique address within a set of allowable addresses, which method comprises the slave stations seeking a unique address only upon receipt of an instruction to do so from said master station, wherein the network includes a group of slave stations that will seek addresses in the same set of addresses, and wherein the master station instructs the slave stations of said group one at a time.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

System Overview

The various aspects of the invention will be illustrated, by way of example only, as applied in a D2B Optical network. The general operation of this network will first be described briefly, as background.

Figure 1:
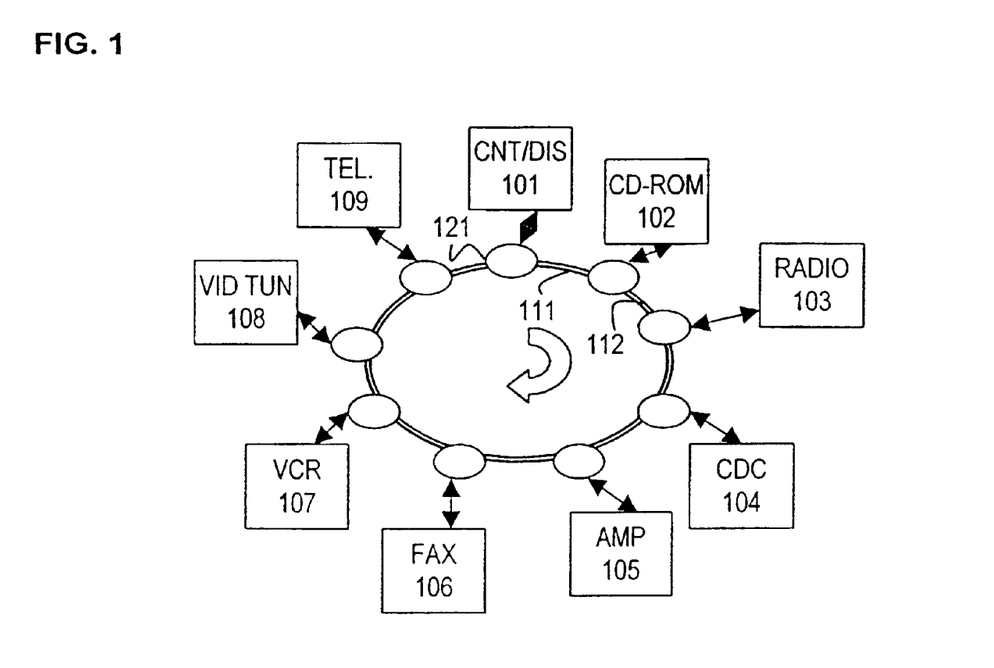
FIG. 1 shows in block schematic form a local communication system embodying the present invention in a ring network.

The system illustrated in FIG. 1 comprises nine audio- or video-related apparatuses 101–109 connected as stations (or nodes) of a Local Area Network (LAN). Of course more or fewer than nine stations may be accommodated. In this example system, the apparatuses are: a control and display unit 101, a Compact Disc memory (CD-ROM) reader 102, a radio turner 103, a CD changer unit 104, an audio power amplifier 105, a facsimile send/receiver unit (FAX) 106, a video recording system (VCR/CAMCORDER) 107, a video tuner 108, and a telephone 109. The display function of the control and display unit 101 may for example provide for display of information read from memory devices by CD-ROM and/or display of video signals from tuner 108 or VCR 107.

The LAN interconnection in the known system comprises nine unidirectional point-to-point fibre optic links 111, 112 etc. linking interface modules 121 etc., each of which is substantially structurally identical, such that the nodes are all connected in a ring. Each fibre optic link carries a combination of digital audio/video signals, CD-ROM data and control messages in accordance with a frame structure to be described in detail below. A designated station (referred to hereinafter as the system master), such as the control/display unit 101, continuously generates the frame structure at a frame sample rate of 20–50 kHz (typically 44.1 kHz as for CD sampling). One station on the network is designated to act as system master on start-up although the role of system master may subsequently be re-allocated to another station, for example in fault conditions.

Figure 2:
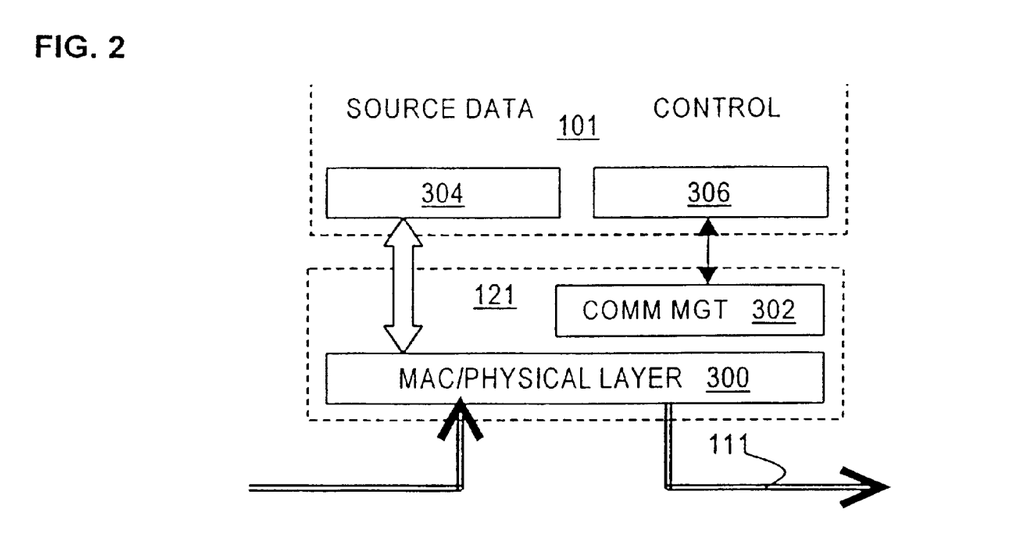
FIG. 2 illustrates the control and source data architecture used in the system of FIG. 1.

The implementation of a station's interface to the fibre optic ring is schematically illustrated in FIG. 2. From the ring 119–111, a media access control (MAC)/physical layer 300 together with a communications management layer 302 for control messages are provided in interface module 121. The communications management layer 302 manages address initialisation and verification and ensures the reliable transport of messages by retransmission according to defined timing rules. Data handling for source data 304 and application protocols for control messages 306 are provided at station level 101, with the application protocols typically defining a device/subdevice grouping and control hierarchy for the station, the format of information exchanged between products, the behaviour of devices/subdevices, and application level timing. It will be readily understood that the interface module 121 may be physically within a station, for example in the form of the Conan integrated circuit or similar network transceiver and associated control software.

Figure 3:
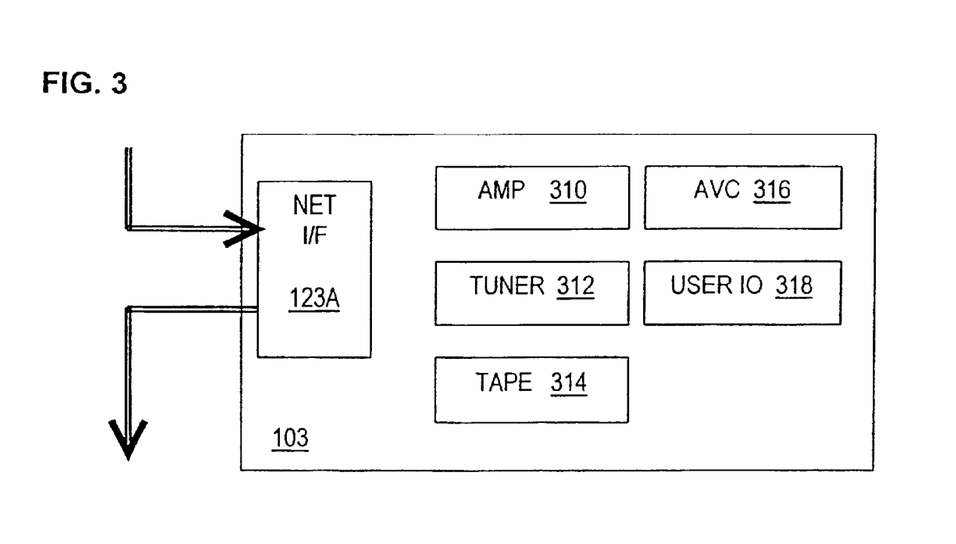
FIG. 3 represents a station with integral interface.

As shown in FIG. 3, where the interface module 123A is provided as one function within a radio cassette player 103 having also amplifier 310, tuner 312, tape playback deck 314, audio/video controller (AVC) 316 and user I/O 318 functions. These functions and their interconnections are not shown and have no direct bearing on the present invention. Their implementation will be readily apparent to those of ordinary skill in the art.

Figure 4:
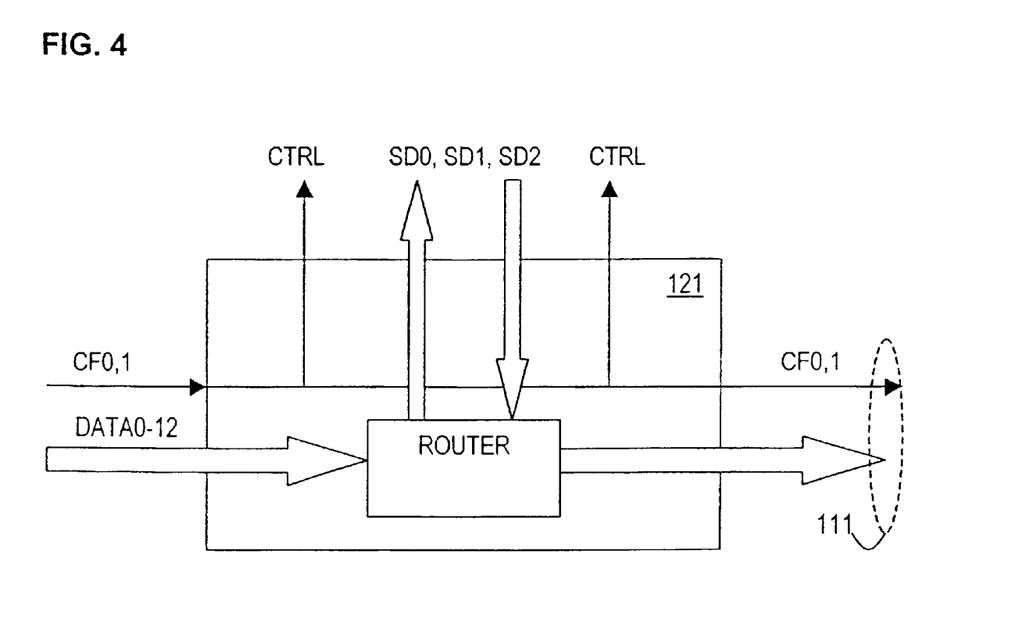
FIG. 4 schematically illustrates one of the interface modules of FIG. 1.

FIG. 4 is a schematic representation of an interface module (in this case node 121) linking a station to the known fibre optic ring. All stations connected to the LAN can generate and/or receive source data (up to three channels SD0-SD2) and control data (CTRL). The control data is of low volume, arrives in burst and is user/event driven (for example user instructions or status changes), whereas the source data is a continuous high volume stream (for example audio, compressed video, CD-ROM data).

In the D2B Optical system, the source data and control messages are transported on the network from node-to-node in frames generated by a station designated as the System Master. Frames are circulated at the same rate as the audio sample frequency, typically fs=44.1 kHz. Frames are grouped into blocks of 48 frames.

Figure 5:
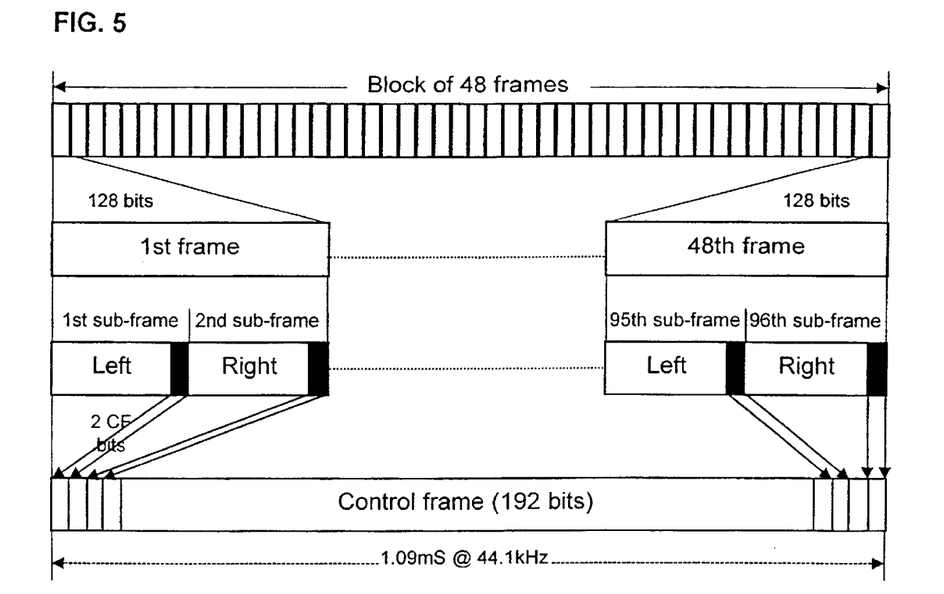
FIG. 5 shows the frame structure of digital signals transmitted according to the known SPDIF format.

FIG. 5 shows how each network frame is divided into two sub-frames ('left' and 'right'). At fs=44.1 kHz, there will be 88,200 sub-frames per second. The left sub-frame is always the first of the pair transmitted on the network. At the physical level, bits are transported with bi-phase encoding. The relationship between the block, frame, sub-frame and control frame is shown in FIG. 5.

Figure 6:
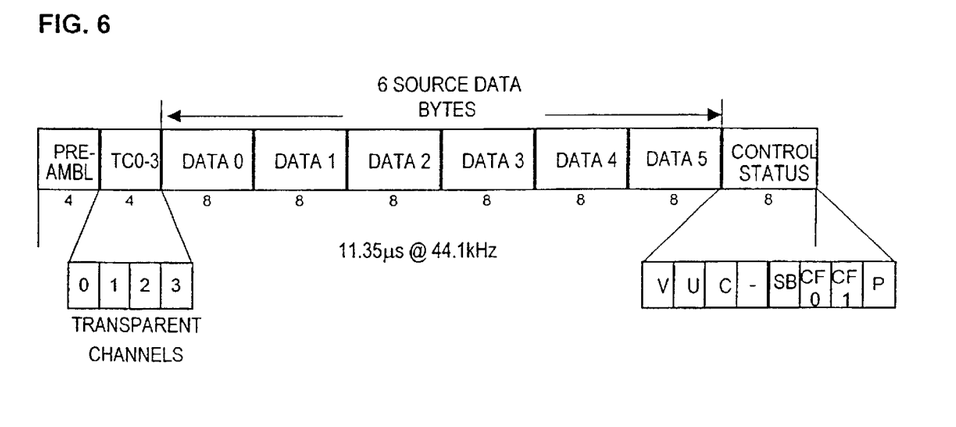
FIG. 6 shows the frame structure of digital signals transmitted between the apparatuses in the system of FIG. 1.

FIG. 6 shows how each sub-frame contains 64 bits, handled within the transceiver as 8 byte fields. The fields comprise the preamble, the transparent channels, 6 bytes of source data, and 8 control/status bits which make up the control frames and the SPDIF status bits. The meaning of the various fields will now be described in detail.

The fields of the sub-frame structure of FIG. 6 are:

Preamble: The preamble synchronises the network receiver. There are three types of preamble, identical to those defined in the IEC-958 (SPDIF) specification. They contain bi-phase coding violations which the receiver can recognise. The three unique preambles identify left, right and block sub-frames. The left preamble identifies the beginning of a frame and the block preamble identifies the beginning of a block. The block preamble replaces every 48th left preamble. This provides a block structure to which the control frame data is synchronised.

Transparent Channels: The four TC bits enable the transport of four serial channels for proprietary control or status information on the network, with no additional hardware or software overhead (see EP-A-0725518).

Source Data Bytes: The source data bytes carry the high-volume real-time digital source data. The bytes may be allocated flexibly, so that the devices in a system may use the source data bytes in the most efficient way for that system (see EP-A-0725520 and EP-A-0725521).

Status Bits: If an SPDIF (IEC-958) channel is being transported, the V, U and C bits of the sub-frame contain the validity, user and channel status bits of the SPDIF channel. The left/right convention of these bits is determined by the left/right preambles. The Start Block bit SB identifies the block boundary of a synchronous SPDIF channel and is set after every block of 192 frames (synchronised with the SPDIF signal that is being transported). This synchronisation is performed automatically by the transceiver chip. The Parity bit P generates even parity for the entire sub-frame.

Figure 7:
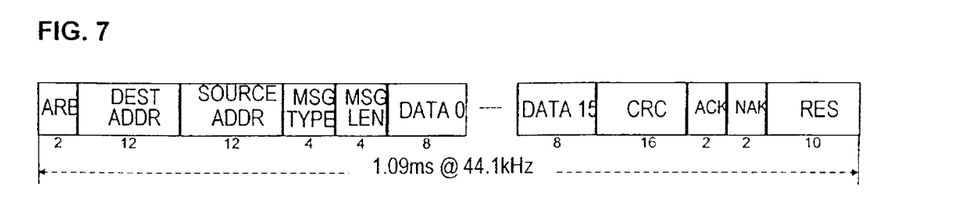
FIG. 7 shows the structure of a control frame for use with the message frame of FIG. 6.

Control Bits: The control bits CF0 and CF1 carry the control messages (for controlling devices and sending status information). There are 2 CF bits per sub-frame, and a control frame is 192 bits long, therefore 96 sub-frames (48 left+48 right) are required to build-up a complete control frame. The control frame is shown in FIG. 7.

As shown in FIG. 5, the control frame is assembled from and aligned with a block of 96 sub-frames, i.e. the first two bits of a new control frame are taken from the sub-frame with a block preamble, and subsequent pairs of bits are taken from subsequent sub-frames to build up a control frame. The fields of the control frame are:

Arbitration bits: These indicate if the control frame is free or occupied. The transceiver handles these bits automatically.

Destination Address: This is the 12-bit address of the destination of the message, in the range '000'H to 'FFF'H. The sending device writes this into its message transmit buffer for transmission. Certain addresses and address ranges have special meanings, such that stations can be addressed either by ring position or by an application-related 'device address'. Broadcast and 'groupcast' addressing is also provided. The initialisation of device addresses is described below.

Source Address: This is the 12-bit address of the sender of the message, in the range '000'H to 'FFF'H. The receiving device can read this from its message receive buffer after reception.

Message Type and Length: Two 4-bit fields normally used to indicate the type/length of the message. Message types include commands, status reports and requests for status reports.

Data 0 to 15: The message data. All 16 bytes are always transported. The Message Length normally indicates how many of the 16 bytes are actually valid for the message. The sending device writes this into its message transmit buffer for transmission. The receiving device can read this from its message receive buffer after reception. The message typically comprises an operation code (op-code) and one or more operands.

CRC: A 16-bit Cyclic Redundancy Check value used to verify that the control frame has been transported without error. The CRC is generated by the interface module automatically on message transmission and checked automatically on message reception.

ACK/NAK: Acknowledge and Not Acknowledge (2-bits each) indicate successful message transmission. The use of separate ACK and NAK flags allow reliable point-to-point and broadcast message transport, as described in our application GB-A-2302243. The flags are automatically filled by the destination device(s) (if present) and read by the sending device.

Reserved: 10 bits are reserved for future definition.

Start Up and Address Initialisation

The action and configuration of the system at start-up and in particular the procedures followed by the system after start-up to initiate address initialisation will now be described. It should be noted at this stage that for control messaging purposes the system may comprise both what will be termed 'installed' and 'uninstalled' devices (stations), the actual composition of the system changing from time to time. (Each station is regarded as an independent 'device' for control purposes, and may include several 'sub-devices' related to its functionality.) A device is only to be termed as installed when the master device has instructed the device to find its own device address and the device has successfully managed to do this and reported the address to the system master. A completely new system will comprise only uninstalled devices.

When the system is powered up the start up and initialisation procedures of the system are executed by the interface circuit and the application firmware in each station to ensure that there is only one system master, that each station has a unique ring position address, and that each station has or obtains a unique device address for application level communication.

In this embodiment the system can be woken by an electrical wake-up pulse on a wire (not shown), separate from the optical fibre, but it is equally possible to use the optical links themselves to initiate start-up. The master station by sending this pulse wakes up all the devices in the system. In certain circumstances the system start-up may be triggered by another device (a slave), which may need to start up the system to receive an incoming call when the system is shut-down.

In the case where the slave device, for example the facsimile terminal 106, wakes up the system it is configured to operate in the following manner:

Set itself to master mode, the slave will in effect be operating as a temporary master station;

Disable its electrical by-pass (see EP-A-07255 17 mentioned above);

Enable its optical output and so cause the device next to it to wake up, and so on around the ring until the slave device detects modulated light at its optical input and so detects that it has woken up the master device; and Set to slave mode and await the master device to send a <Report Position> status request message.

Figure 9:
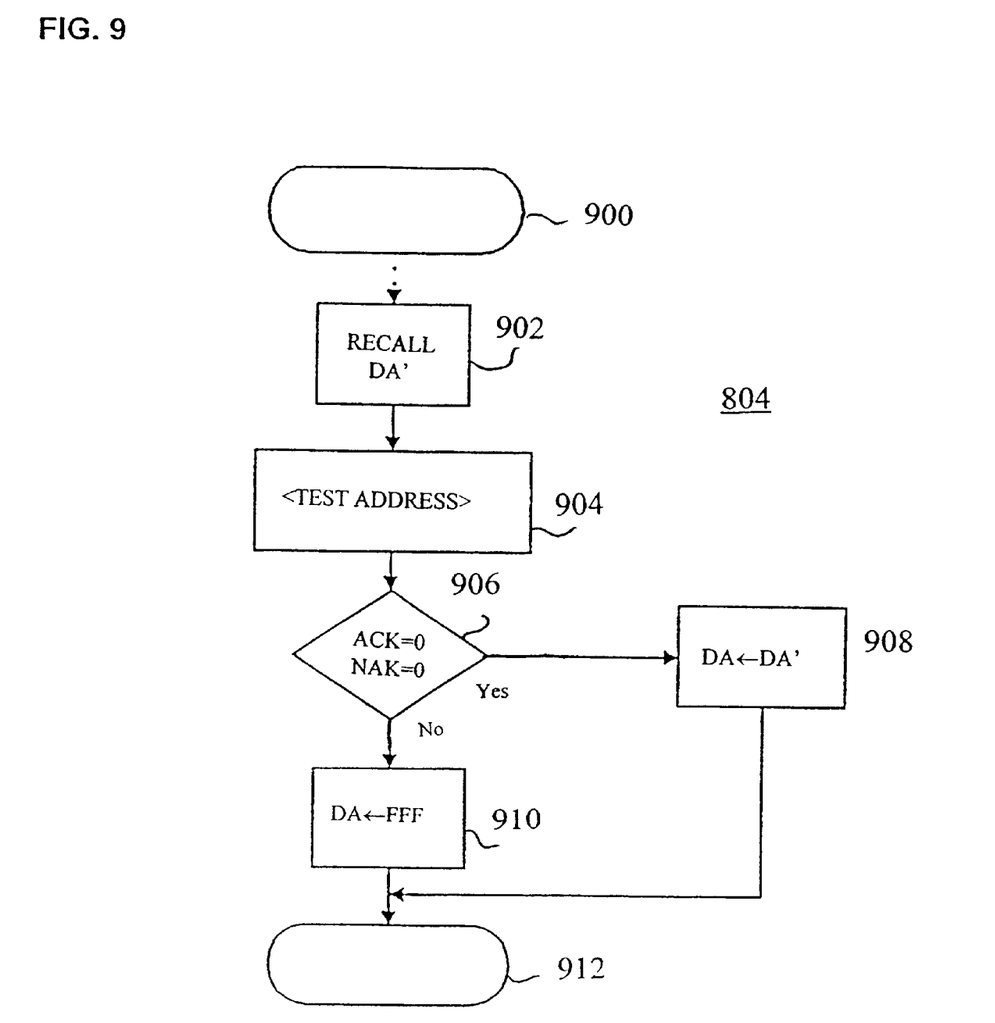
FIG. 9 shows the address initialisation procedure for an 'installed' station in the system.

The procedure from then on is the same as if the master device itself had triggered the start up procedure, and that is as follows. The system master will:

Configure the appropriate internal clock source;

Set itself to act as master;

Disable its electrical by-pass and this action should take place as soon after the device has woken up as is possible;

Enable its optical transmitter output. With an optical based system the presence of modulated light will cause a device and therefore the station to awaken. This action is repeated around the ring until all of the devices have awoken, a fact that the master device recognises when it receives modulated optical light at its own optical input;

Wait until lock has been achieved, and in this the master assumes that all the devices and therefore stations in the system are active;

Waits a little while longer to enable the slave devices to achieve lock also;

Send a <Set Position> message to the devices in the system. This special message is modified by each station, so as to allocate unique ring position addresses in the manner described in EP-A-0725516 (alternatively, physical addresses could be set by switches);

Initialise its own device address, which will normally be a constant for the type of devices and the system involved (in this the master acts as an 'installed' device to confirm that its device address is in fact unique—see FIG. 9 described below); and Broadcast a <Report Position> status request message which details the master station's device address and requests every other station to report its ring position and device address. This signal may also be used to indicate to the system that normal message exchange can commence.

Subsequently, the stations co-operate such that each can obtain its unique device address. For this purpose, we shall distinguish between 'installed' stations, which have already a stored device address obtained after a previous start-up, and 'uninstalled' stations, which do not. The uninstalled stations are assigned a general default address of 'FFF'H until they are installed.

Simply applying the known address initialisation system (WO-95/01025), the Report Position message from the master device could be used as the trigger for the other stations to find their own unique device address, which they will then report along with their ring position. In the present system, however, the installed stations will merely verify that their stored address is still unique, and uninstalled stations will not seek their unique device address at all until individually instructed to do so by the master station. These procedures will be described in detail with reference to FIGS. 8 to 11.

For operation of the device address initialisation processes, certain messages are defined, to be sent by the various stations. These can for example be implemented by a common operation code (op-code)followed by operands specifying the exact message, or by dedicated op-codes.

<Test Address> is a message which can be sent by any station and is addressed to a specific device address to test whether that address is already taken by another station. All stations with different devices addresses naturally ignore the message, but the interface of a station having the specified device address will set the ACK or NAK field in the message frame. At the application level, the receiving station simply ignores this message.

<Get New Address> is a message by which the master station can command an individual slave station to begin seeking a unique device address. The message is addressed to a specific uninstalled station using an address in the ring position ("physical") range of addresses, since all uninstalled stations share the same default device address ('FFF'H).

<Set Device Address> allows a master station to command a slave station (addressed by ring position address) to set itself a device address specified by the master.

<Position Report> is a reply to the <Report Position> request sent by the master station. The Position Report message specifies the ring position and device address of the sending station. By processing these messages, the master station builds a table of installed and uninstalled stations, according to ring position, and records the device address for each installed station.

Figure 8:
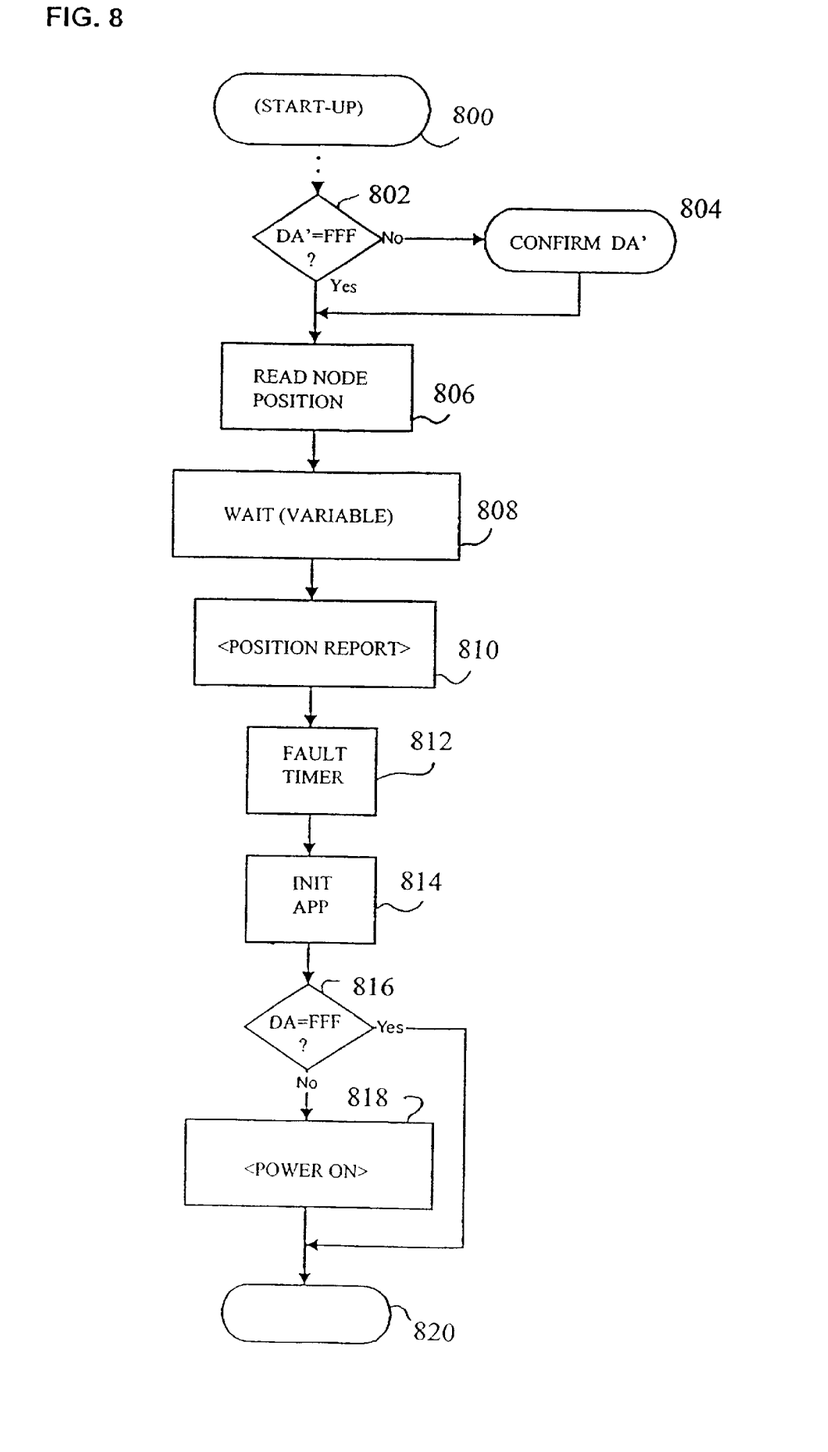
FIG. 8 shows the general initialisation procedure for a slave station in the system of FIG. 1.

FIG. 8 shows the general initialisation procedure implemented by each slave station. At step 800, the start-up procedures already described are complete, and the Report Position request has been noted. The following steps are now performed.

At 802, the slave tests whether it is an installed or an uninstalled device, by comparing its stored device address (DA') with the general default address 'FFF'H. If DA' is not 'FFF'H, the device is already installed and at 804 a procedure is executed (FIG. 9, described below) to confirm that the stored address is still unique.

At step 806, all slave devices read their ring position from the interface, at 808 a delay dependent on the ring position is implemented, and at 810 the Position Report message is sent. The variable delay (for example 25 ms plus 30 ms times the ring position) avoids all stations trying to send their Position Report messages at the same time, since the master has to receive and process all of these messages in turn. It is applied in the described system whenever the master station broadcasts a status request requiring response from all slave stations. Upon receiving each report, the master station implements a procedure (FIG. 10) to log the presence of the device in a device list.

At 812 a fault monitoring timer is started, and at 814 the internal application of the station (control program for normal operation) is initialised. At 816, the device address is again examined to see whether the station is installed. If so, at 818 a <Power On> status report is sent to the master station to indicate that the device is fully functional, and normal operation commences at 820. If the station is uninstalled (DA='FFF'H), the station enters normal operation without reporting power on status. FIG. 9 shows the procedure of step 804 (FIG. 8), by which a previously installed device confirms that its stored device address is still unique. When power is first applied, the slave station interface circuit (119 etc) always takes the default address (DA= 'FFF'H). At 902, the controller of the slave station looks up the stored device address (DA' different from 'FFF'H). At 904 a Test Address message is sent to test whether the stored address DA' is unique. An acknowledgement (either ACK or NAK) means that another station (which may have been inserted into the network since the last start-up) already has that address. This is tested at 906 and, in the case of no acknowledgement, the stored address DA' is adopted as the device address DA at 908. If acknowledgement is received, the station adopts the uninstalled address DA='FFF'H at step 910. The procedure ends at 912, with the station either having confirmed its previous address as unique, or having reverted to the status of an uninstalled device.

Note that the interface of another station which has not yet confirmed its address will have the address 'FFF'H, and will not acknowledge a test message, even though the station has stored from a previous start-up the same address as the test address. Afterwards, the other station will attempt to verify that its stored address is unique, and will find that it is not. By this mechanism, there is a chance the an installed station will 'lose' the address which it has used already, when a competing station is introduced into the system which regards itself as 'installed' because it has been using that address in a different system. This can be avoided if desired, by ensuring that the incoming station is reset to uninstalled status before start-up. The master can also control the system specifically to correct the change, if desired, for example to preserve addressing of similar stations in ring position order.

Referring again to FIG. 8, an uninstalled station will simply report (step 810) the general default address to the master device along with its ring position, while an installed station which has confirmed its address is unique will report that address. These reports come in order of ring position, according to the delay step 808. By this time, the master is watching for all kinds of messages on the network. The procedure followed by the master when it receives each Position Report message, will now be described.

Figure 10:
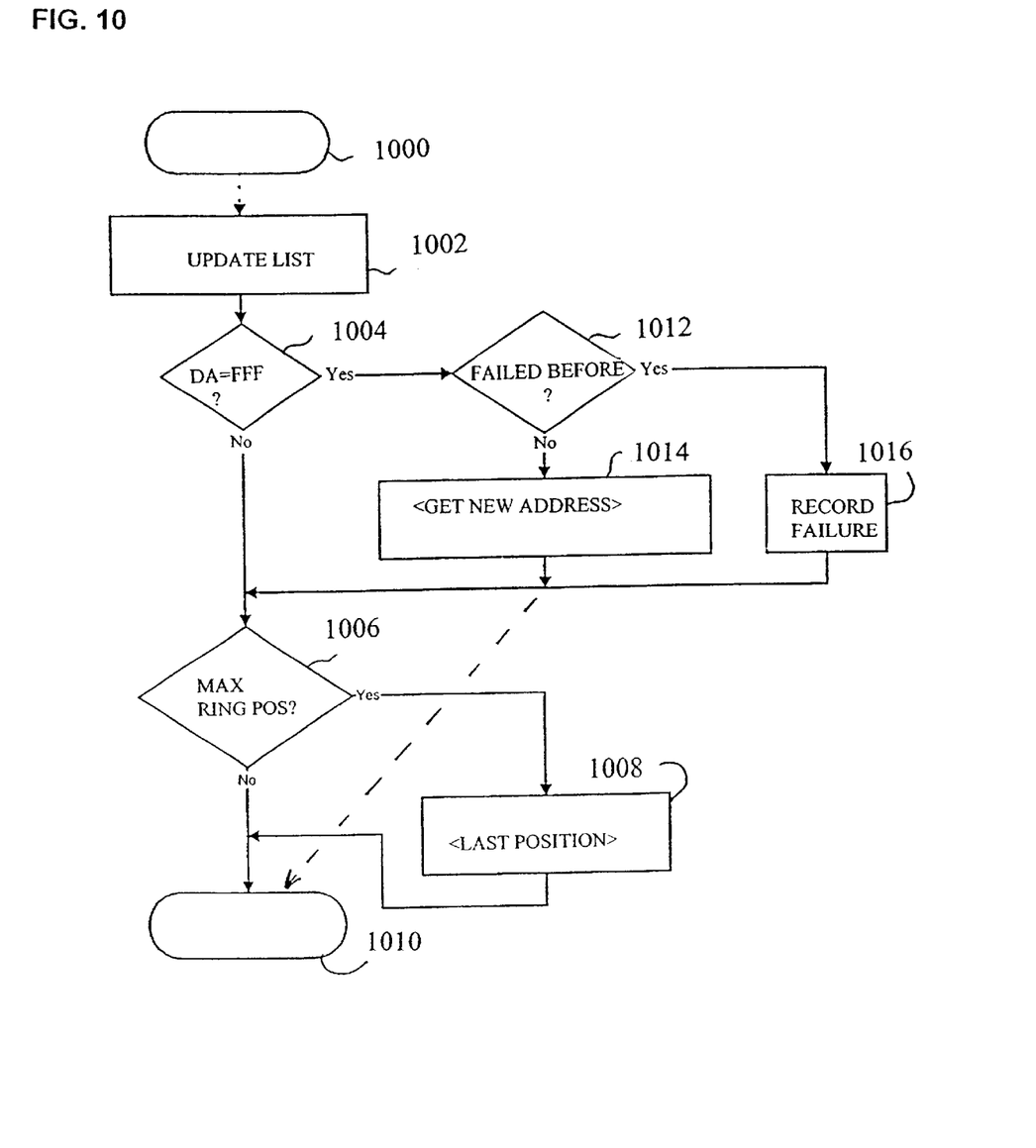
FIG. 10 shows the procedure implemented by the master station to log the presence of each slave station.

FIG. 10 shows a procedure to log the presence of a slave station whenever the master receives a Position Report message (1000). At 1002, the master first adds the device address and ring position from the report to its stored table or device list. At 1004, it is then tested whether the reported device address indicates an installed or an uninstalled device (DA='FFF'H).

For an installed device (DA not equal to 'FFF'H), the ring position is compared at 1006 with a previous highest ring position, stored from previous reports. If the new ring position is higher, a <Last Position> message is broadcast to all stations at step 1008, informing them of the highest ring position so far. Normal operation continues at 1010, whereupon the master will wait for further messages.

Figure 11:
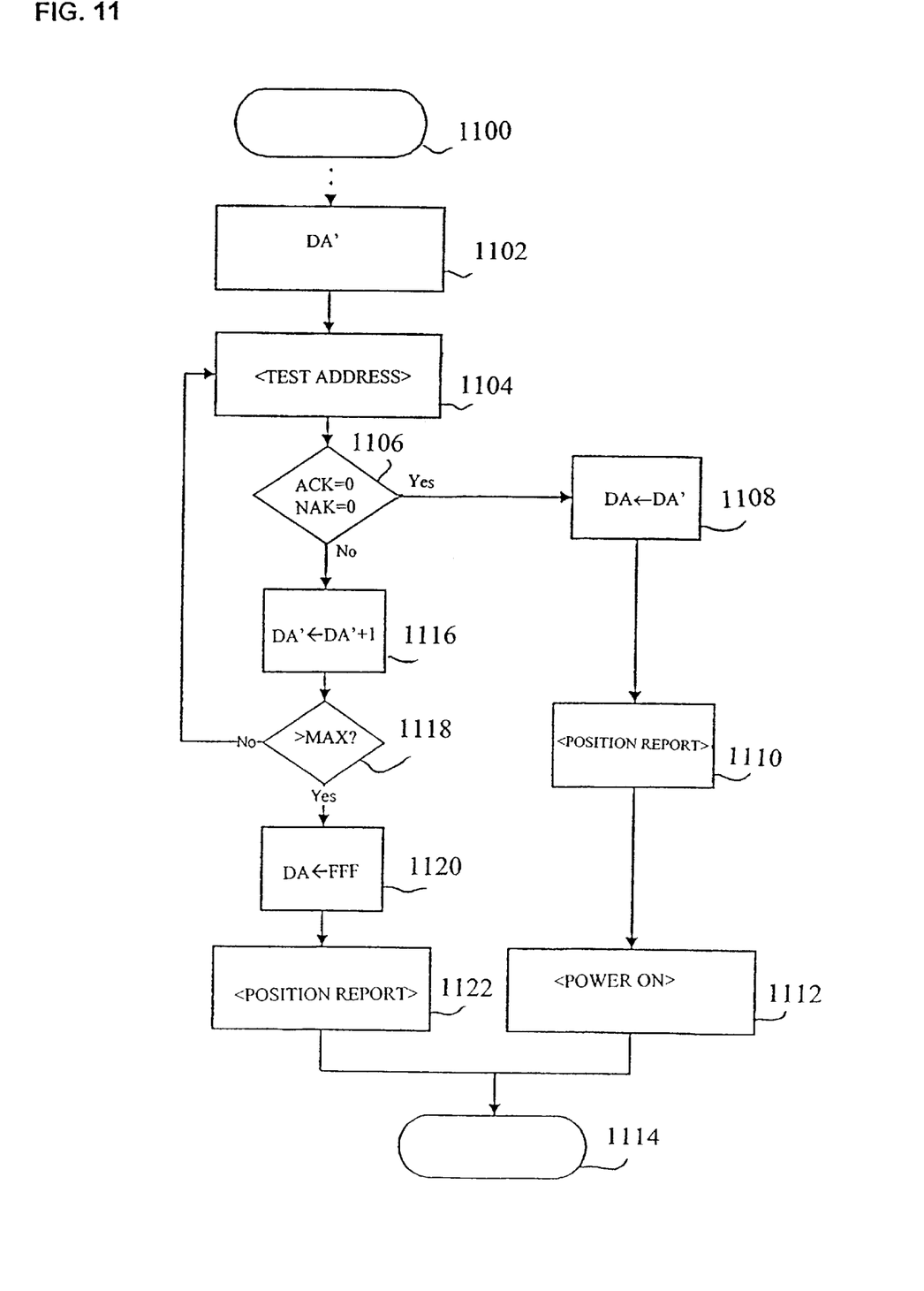
FIG. 11 shows the address initialisation procedure for an 'uninstalled' station.

If the test at 1004 indicates an uninstalled device (DA= 'FFF'H), it is checked at 1012 whether an attempt has already been made to install this device, and failed. Assuming it has not, the Get New Address command mentioned above is sent (1014) to the slave station, by use of the ring position address, to initiate the autonomous process whereby the slave can arrive at a unique device address (FIG. 11, described below). If an attempt has been made previously to install this device, then a record of the failure is made at 1016, and the slave simply retains the default address 'FFF'H. Flow then passes to step 1006, to check the ring position against the highest recorded position. In an alternative embodiment, flow passes from step 1014 direct to the exit 1010, bypassing steps 1006 and 1008. Th is avoids broadcasting the Last Position command too often in the middle of address initialisation. The steps 1006 and 1008 will in any case be executed later for this slave station, when it reports its newly found address (step 1110 below).

FIG. 11 shows the procedure implemented by each uninstalled slave station when it receives a Get New Address command from the master (1100). As mentioned above, and as further explained in WO-95/01025, each type of apparatus can have a different address range, within the twelve-bit range of D2B addresses. Disc players such as the CD changer 104 (FIG. 1) may for example take addresses in the range '190'H to '197'H, so that up to eight disc players can be addressed in the system. This range is programmed into the station by the manufacturer. In other types of network, however, all stations may complete for addresses in the same range.

At 1102, the slave station identifies the lowest address in its range (say '190'H) as a candidate address DA', and at 1104 sends a Test Address message addressed to that address. At 1106, the slave looks for any ACK/NAK response of another station having the address. If there is no response, the station assumes that the tested address is free and at 1108 stores the address as its own device address for future communication. A Position Report is sent to the master at 1110 to inform it of the new address, and the Power On status report sent at 1112. The slave is now an installed device, and normal operation continues from step 1114.

If at 1106 an acknowledgement is detected, this means that another station is already using the tested address. In this case, the test address is incremented at 1116, and checked at 1118 to see if it is out of the permitted range. If not out of range, the procedure from 1104 is repeated until a free address is found and reported to the master. If the incremented test address is out of range, control passes to step 1120. Here, the slave simply keeps the uninstalled address 'FFF'H as its device address, and at 1122 sends a Position Report to the master before resuming normal operation at 1114.

By the above procedure, the instructed device seeks a unique address by stepping through the range of addresses available to it, sending messages to each address in turn an awaiting a response. If the device finds an address which does not receive acknowledgement, this is the address that the device adopts as its own unique device address. However if the device is unable to locate an available address it maintains the default address as its address and remains as uninstalled with regard to the master device. Such a situation will for example arise if too many devices are competing for addresses in the same range. The master has the option later to set a unique address by the Set Device Address command, for example in an 'overflow' range.

Since the master will generally receive position reports from the slaves in the order of their ring position, they will be instructed in this order to seek and find their own unique addresses. This means that similar installations in two vehicles (or buildings) will generally achieve the same addresses. If desired, this can be guaranteed by not just relying on the timing of receipt of the Position Report messages, but instead waiting until they are all received and then stepping systematically through the uninstalled devices to send the Get New Address command. In any event, since the slaves are instructed one at a time to seek their addresses, the reliability and speed of the address initialisation particularly for completely new installations, is improved by reducing bus traffic and by avoiding the situation where two stations can simultaneously arrive at the same address. The master can optionally wait for each station to report its device address before instructing the next station to seek an address, to eliminate the possibility that two stations are seeking an address in the same range at the same time.

Those skilled in the art will appreciate that the invention is not limited to the above embodiments, and can be applied in a variety of network types and configurations.

For example, in a synchronous network one of the stations will generally be assigned as the master station for timing, with the other stations in the system assigned to synchronise as slaves to this master station. The designation of the master and slave stations for the address initialisation can be made the same as the timing master, but need not be so. For example, the timing master in a D2B Optical system may be a digital audio tuner, while the master station for the purposes of initialisation and functional control is the head unit. Further, it is also possible to provide the system with one or more stations which are capable of becoming the system master in the event of a fault, or for certain operations.

Similarly, although in the embodiments communication with the master before address initialisation is complete depends on the unique physical (ring position) addresses, other mechanisms can be implemented to prevent two stations seeking addresses within the same range at the same time, either under master control or by co-operation between the slaves. For example, each slave station, when reporting its presence, can broadcast that it is about to seek its address, and other slave stations will not seek their own addresses in the meantime. A simple arbitration can be performed by which each slave in turn takes this step.

What is claimed is:

1. A local communication system comprising a plurality of stations of which one station is designated a master station and the other stations designated as slave stations, the plurality of stations being interconnected in a network for the exchange of messages, wherein each of the slave stations has the capability to implement an autonomous process to find and store for future use its own unique address within a set of allowable addresses, wherein each slave station is arranged only to begin said autonomous process to seek its own address when individually instructed by a command from the master station to do so.

2. A system as claimed in claim 1, wherein the master station is arranged, at least where a group of two or more slave stations may seek addresses within the same set of addresses, to instruct the slave stations of said group one at a time.

3. A system as claimed in claim 1 wherein the unique address comprises a logical address additional to a unique physical address already assigned to the slave station prior to said autonomous process.

4. A system as claimed in claim 3 wherein the slave stations are instructed to begin said autonomous process by means of messages addressed using said physical address.

5. A system as claimed in claim 3 wherein the unique physical address is set automatically during start-up of the system, according to each station's position in the network.

6. A system as claimed in claim 3 wherein each slave station is arranged after start-up to send a report to the master station indicating the presence of the slave station together with its physical address.

7. A system as claimed in claim 6 wherein said report specifies a logical address, if any, stored from a previous session of operation before start-up.

8. A system as claimed in claim 6 wherein each slave station is arranged to delay sending its presence report after start-up by a time depending on the physical address of the slave station, so that the master station will not receive presence reports from all slave stations simultaneously.

9. A system as claimed in claim 1 wherein the slave stations are regarded as either installed or uninstalled by the master station with a station being regarded as installed once it has been instructed by the system master to find its unique address and has successfully achieved this and sent a report to the master specifying the unique address, and wherein each installed station stores its unique address and retains its installed status after subsequent start-ups.

10. A system as claimed in claim 9 wherein stations regarded as uninstalled assume a general default address.

11. A system as claimed in claim 9 wherein only uninstalled stations require individual instruction from the master station to begin said autonomous process.

12. A system as claimed in claim 10 wherein for stations already installed said autonomous process is modified so as to verify whether the address stored from a previous start-up is still unique, and wherein, if the stored address is no longer unique, a station will revert to uninstalled status.

13. A system as claimed in claim 1 wherein slave stations when uninstalled are arranged to report their uninstalled status to the master station after startup, and the master is arranged to instruct each one automatically in response to the report.

14. A system as claimed in claim 13 wherein the slave stations are arranged to delay sending their respective presence reports after start-up by different amounts of time, so that the master station will not receive presence reports from all slave stations simultaneously.

15. A system as claimed in claim 1 wherein slave stations when uninstalled are arranged to report their uninstalled status to the master station after startup, and the master is arranged to identify all uninstalled stations, and to instruct them in turn to begin said autonomous process.

16. A system as claimed in claim 1 wherein the uninstalled stations are instructed to begin said autonomous process at least approximately in the order of their position in the communication system network.

17. A system as claimed in claim 1 wherein said autonomous process comprises the slave station sending at least one test message addressed to a candidate address, adopting the candidate address as the unique address in the event that no other station acknowledges the test message and, in the event that another station does acknowledge the test message, selecting a new candidate address and repeating until a unique address is found or all allowable candidate addresses have been tried.

18. An apparatus for use as a slave station with other stations in a local communication system, the apparatus comprising means for implementing an autonomous process to find and store for future use a unique address within a set of allowable addresses, wherein the apparatus when operating as a slave station is arranged to initiate said autonomous process only in response to a command sent from a master station to the slave station individually.

19. An apparatus as claimed in claim 18 which when operating as a slave master station is arranged to identify itself by sending a presence report to the master station after start-up.

20. An apparatus as claimed in claim 19 which when operating as a slave station is arranged to specify in said presence report whether the slave station retains a unique address from a previous start-up, and to initiate said autonomous process only in the event that it does not retain a unique address.

21. An apparatus as claimed in claim 19 wherein said unique address is a logical address additional to a unique physical address and wherein the apparatus when operating as a slave station is arranged to specify in said presence report a unique physical address by which the master can address the apparatus to instruct initiation of said autonomous process.

22. An apparatus for use as a master station with other stations in a local communication system, the apparatus comprising means for instructing each slave station after start-up to implement an autonomous process to find and store for future use a unique address among a set of allowable addresses, wherein the apparatus when operating as the master station is arranged to instruct each slave station individually to initiate said autonomous process.

23. An apparatus as claimed in claim 22 which when operating as the master station is arranged to identify each slave station by reference to respective presence reports received from the slave stations after start-up.

24. An apparatus as claimed in claim 22 which when operating as the master station is arranged to distinguish by information contained in said presence reports whether each slave station retains a unique address from a previous start-up, and not to instruct those stations which retain a unique address to initiate said autonomous process.

25. An apparatus as claimed in claim 23 wherein said unique address is a logical address additional to a unique physical address and wherein the apparatus when operating as the master station is arranged to identify from each said presence report the physical address of the respective slave station, and to use said physical address to instruct the respective slave station to initiate said autonomous process.

26. A method of operating a local communication system comprising a plurality of stations of which one station is designated a master station and the other stations are designated as slave stations, the plurality of stations being interconnected in a network for the exchange of messages, wherein each slave station implements an autonomous process to find and store for future use a unique address within a set of addresses, wherein the slave stations are arranged to begin said autonomous processes only upon receipt of an instruction to do so from said master station, wherein the system includes at least a group of slave stations that will seek addresses in the same set of addresses, and wherein the master station instructs the slave stations of said group one at a time.

27. A method as claimed in claim 26 wherein said slave stations are arranged to perform said autonomous process after installation and start-up of the network, and to store their unique addresses for use after subsequent start-ups, slave stations having a stored unique address being exempt from said autonomous process at subsequent start-ups.

28. A method of operating a local communication system comprising a plurality of stations of which one station is designated a master station and the other stations are designated as slave stations, the plurality of stations being interconnected in a network for the exchange of messages, wherein each slave station implements an autonomous process to find and store for future use a unique address within a set of addresses, wherein the slave stations are arranged to begin said autonomous processes only upon receipt of an instruction to do so from said master station.

29. A method as claimed in claim 28 wherein the system includes at least a group of slave stations that will seek addresses in the same set of addresses, and wherein the master station instructs the slave stations of said group one at a time.

* * * * *